United States Patent [19]
Huling

[11] Patent Number: 5,873,548
[45] Date of Patent: Feb. 23, 1999

[54] AIRACRAFT HYDRAULIC SYSTEM FOR IMPROVED RELIABILITY OF INTEGRATED HYDRAULIC PROPULSION CONTROLS

[75] Inventor: Don W. Huling, Kent, Wash.

[73] Assignee: The Boeing Company, Seattle, Wash.

[21] Appl. No.: 708,219

[22] Filed: Sep. 6, 1996

[51] Int. Cl.$^6$ .................................................... B64C 13/36
[52] U.S. Cl. ............................ 244/78; 244/75 R; 60/403; 60/422
[58] Field of Search .................................... 244/78, 75 R; 60/403, 420–422

[56] References Cited

U.S. PATENT DOCUMENTS

| | | | |
|---|---|---|---|
| 3,667,223 | 6/1972 | Thurston | 60/420 |
| 4,428,196 | 1/1984 | Boehringer | 244/78 |
| 5,100,082 | 3/1992 | Archung | 244/78 |
| 5,277,020 | 1/1994 | Dehu et al. | 244/78 |

OTHER PUBLICATIONS

C.D. Galy, "Airbus Hyudraulic power always available", Hydraulics and Pnematics, vol. 25, No. 12, Dec. 1972.

*Primary Examiner*—Galen L. Barefoot
*Attorney, Agent, or Firm*—Christensen O'Conner Johnson & Kindness PLLC

[57] ABSTRACT

A system (10) is provided for maintaining continuity of hydraulic power from an aircraft engine-driven hydraulic pump (28) to a first set of propulsion control hydraulic loads for controlling the aircraft engine (30). The engine-driven hydraulic pump provides hydraulic power to a second set of airframe hydraulic loads. The engine-driven hydraulic pump has a pump suction (26) having a first pressure and a pump discharge (34) having a second pressure that is greater than the first pressure. The system includes an accumulator (16) coupled to the engine-driven hydraulic pump suction, and the accumulator is chargeable at a third pressure that is less than the first pressure. A relief valve (18) is coupled to the engine-driven hydraulic pump suction, and the relief valve has a relief setpoint at a fourth pressure that is greater than the second pressure. An isolation valve (12) has first ports (36, 38) coupled to the first set of propulsion control hydraulic loads, second ports (46, 50, 54) coupled to the second set of airframe hydraulic loads, and third ports (24, 32) coupled to the hydraulic pump. The isolation valve has a first state and a second state. The isolation valve places the third ports in fluid communication with the first and second ports when the isolation valve is in the first state. The isolation valve isolates the second ports from the third ports when the isolation valve is in the second state, and the isolation valve maintains the first ports in fluid communication with the third ports when the isolation valve is in the second state. The present invention thus maintains a supply of hydraulic fluid to the first set of propulsion control hydraulic loads when the second set of airframe hydraulic loads has been isolated.

19 Claims, 7 Drawing Sheets ly impacts engine control in supersonic aircraft. Typically,

AIRCRAFT HYDRAULIC SYSTEM FOR IMPROVED RELIABILITY OF INTEGRATED HYDRAULIC PROPULSION CONTROLS

FIELD OF THE INVENTION

The present invention relates to aircraft hydraulic systems and, more particularly, to an aircraft hydraulic system for improved reliability of integrated hydraulic propulsion controls.

BACKGROUND OF THE INVENTION

Aircraft hydraulic systems supply numerous hydraulic loads that are critical for flight control and safety. In general, aircraft hydraulic systems supply two major hydraulic load centers—airframe hydraulic loads and propulsion control hydraulic loads. Airframe hydraulic loads include loads such as: the nose landing gear extension and retraction; the main landing gear extension and retraction; the main landing gear brakes; the high lift devices on the wing leading edge and trailing edge; the ailerons; the flaperons; the spoilers; the rudder; the horizontal stabilizer; and the elevators. Propulsion control hydraulic loads include loads such as: the thrust reverser; the engine inlet bypass door; the engine variable geometry inlet; and the engine variable geometry nozzle. In order to reduce maintenance requirements and weight constraints, it is well known to integrate propulsion hydraulics with airframe hydraulics by supplying propulsion control hydraulic loads and airframe hydraulic loads with the same engine-driven hydraulic pump. Accordingly, integrated hydraulic systems are desirable in supersonic aircraft.

Casualty control considerations are major factors in the design of integrated aircraft hydraulic systems. For example, in the event of an engine fire, it is important to stop the supply of hydraulic fluid into any compartment where ignition sources are present, such as to an engine mounted hydraulic pump. To that end, known systems are configured for preventing the flow of hydraulic fluid from an aircraft hydraulic system from feeding an engine fire. Such a known system includes a firewall shutoff valve located in the hydraulic pump suction line. The shutoff valve is normally open, but can be closed to prevent hydraulic fluid from the hydraulic system from feeding an engine fire. Another known system includes a reservoir level sensor, and first and second switches at first and second reservoir levels. When the reservoir level sensor senses a drop in reservoir level to the first level, the first switch actuates and isolates one-half of the hydraulic loads in the hydraulic system. If the reservoir level continues to drop to the second level, the second switch actuates. This restores to service the hydraulic loads previously isolated, and isolates the remaining half of the hydraulic loads of the hydraulic system. Such a system does not maintain a continuous supply of hydraulic fluid to propulsion control hydraulic loads.

It is important to maintain a continuous supply of hydraulic fluid to propulsion control hydraulic loads in the event of a hydraulic system failure. In known integrated hydraulic systems, a failure, such as a leak in the airframe hydraulic loads, may be controlled by closing the firewall shutoff valve. This results in an unnecessary loss of propulsion control hydraulics. Further, failures within a hydraulic system that cause leaks result in loss of operation of the entire hydraulic system. A majority of these failures occur in components outside the engine-installed hydraulic equipment.

The loss of propulsion control hydraulics especially impacts engine control in supersonic aircraft. Typically, supersonic aircraft engines include two sets of engine inlet controls. Each set of engine inlet controls is generally supplied by a separate engine-driven hydraulic pump. The engine inlet controls are necessary for containing the sonic shock wave generated during supersonic operation within the engine inlet, and preferably maintaining a normal shock wave position within the engine inlet. If both sets of engine inlet controls are lost due to a loss of the propulsion control hydraulic systems, the normal shock wave cannot be contained within and maintained at the proper position within the engine inlet. The engine must then be operated in a transonic or subsonic mode. Therefore, in a supersonic aircraft having an integrated hydraulic system, it is desirable to maintain hydraulic power to both sets of engine inlet controls for controlling the engine.

A dedicated propulsion control hydraulic system that is separate from an airframe control hydraulic system can be provided to maintain continuity of propulsion control hydraulics in the event of a failure of airframe control hydraulics. However, a dedicated propulsion control hydraulic system greatly increases maintenance requirements and adds considerable weight. Therefore, it would be desirable to provide an integrated aircraft hydraulic system with a system for maintaining a continuous supply of hydraulic power to propulsion control hydraulic loads, including engine inlet controls, in the event of a failure in the airframe hydraulic loads. However, no current integrated aircraft hydraulic systems are known to provide a system for maintaining continuity of hydraulic power to propulsion control hydraulic loads.

SUMMARY OF THE INVENTION

According to the present invention, a system is provided for maintaining continuity of hydraulic power from an aircraft engine-driven hydraulic pump to a first set of propulsion control hydraulic loads for controlling the aircraft engine. The engine-driven hydraulic pump provides hydraulic power to a second set of airframe hydraulic loads. The engine-driven hydraulic pump has a pump suction having a first pressure and a pump discharge having a second pressure that is greater than the first pressure. The system includes an accumulator coupled to the engine-driven hydraulic pump suction, and the accumulator is chargeable at a third pressure that is less than the first pressure. A relief valve is coupled to the engine-driven hydraulic pump suction, and the relief valve has a relief setpoint at a fourth pressure that is greater than the second pressure. An isolation valve has first ports coupled to the first set of hydraulic loads, second ports coupled to the second set of hydraulic loads, and third ports coupled to the hydraulic pump. The isolation valve has a first state and a second state. The isolation valve places the third ports in fluid communication with the first and second ports when the isolation valve is in the first state. The isolation valve isolates the second ports from the third ports when the isolation valve is in the second state, and the isolation valve maintains the first ports in fluid communication with the third ports when the isolation valve is in the second state.

Therefore, the present invention maintains continuity of hydraulic power to propulsion control hydraulic loads in an integrated aircraft hydraulic system. When a failure is detected in an integrated aircraft hydraulic system that supplies hydraulic power to airframe hydraulic loads and propulsion control hydraulic loads with the same engine-driven hydraulic pump, the system of the present invention maintains the flow of hydraulic fluid to the propulsion control hydraulic loads when the airframe hydraulic loads are isolated. Thus, the present invention allows segregation of a majority of failures within the non-engine portion of the hydraulic system from the non-failed components of the engine portion for improved hydraulic power reliability for the propulsion controls. In a supersonic engine, hydraulic power is maintained to both sets of propulsion control hydraulic loads, and the engine remains in supersonic operation at a higher reliability state.

According to one aspect of the present invention, the isolation valve is a spool and sleeve valve having a spool that defines first and second sets of flow channels. The first set of flow channels is arranged for coupling the first and second ports in fluid communication with the third ports when the spool is in a first position, the isolation valve being in the first state when the spool is in the first position. The second set of flow channels is arranged for isolating the second ports from the third ports and for coupling the first ports in fluid communication with the third ports when the spool is in a second position, the isolation valve being in the second state when the spool is in the second position.

According to another aspect of the present invention, a heat exchanger is coupled to a case drain of the engine-driven hydraulic pump. The heat exchanger is coupled in fluid communication with the first and second sets of hydraulic loads when the isolation valve is in the first state and the second set of hydraulic loads when the isolation valve is in the second state.

In one embodiment of the present invention, a supply header to the first set of hydraulic loads is coupled to the hydraulic pump discharge. The first set of flow channels is arranged for placing a suction header from the first set of hydraulic loads in fluid communication with the hydraulic pump suction when the spool is in the first position. The first set of flow channels is arranged for placing an airframe supply header to the second set of hydraulic loads in fluid communication with the hydraulic pump discharge when the spool is in the first position. The second set of flow channels is arranged for placing the return header from the first set of hydraulic loads in fluid communication with the hydraulic pump suction when the spool is in the second position.

In another embodiment of the present invention, the first set of flow channels is arranged for placing a suction header from the first set of hydraulic loads in fluid communication with the hydraulic pump suction when the spool is in the first position. The first set of flow channels is arranged for placing a supply header to the second set of hydraulic loads in fluid communication with the hydraulic pump discharge when the spool is in the first position. The first set of flow channels is arranged for placing a supply header to the first set of hydraulic loads in fluid communication with the supply header to the second set of hydraulic loads when the spool is in the first position. The second set of flow channels is arranged for placing the return header from the first set of hydraulic loads in fluid communication with the hydraulic pump suction when the spool is in the second position. The second set of flow channels is arranged for placing the supply header to the first set of hydraulic loads in fluid communication with the hydraulic pump discharge when the spool is in the second position.

According to another embodiment of the present invention, an aircraft hydraulic system provides hydraulic power to sets of engine control hydraulic loads and airframe hydraulic loads. A first hydraulic pump is driven by a first aircraft engine, and a second hydraulic pump is driven by a second aircraft engine. A first set of first engine control hydraulic loads controls the first aircraft engine and is coupled to the first hydraulic pump. A second set of engine control hydraulic loads controls the first aircraft engine, and is coupled to the second hydraulic pump. A first set of airframe hydraulic loads is coupled to the first hydraulic pump. A first isolation valve is coupled to the first set of airframe hydraulic loads, the first set of first engine control hydraulic loads, and the first hydraulic pump. The first isolation valve is arranged for isolating the first set of airframe hydraulic loads from the first hydraulic pump and for maintaining the first set of first engine control hydraulic loads in fluid communication with the first hydraulic pump when the first set of airframe hydraulic loads is isolated from the first hydraulic pump.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
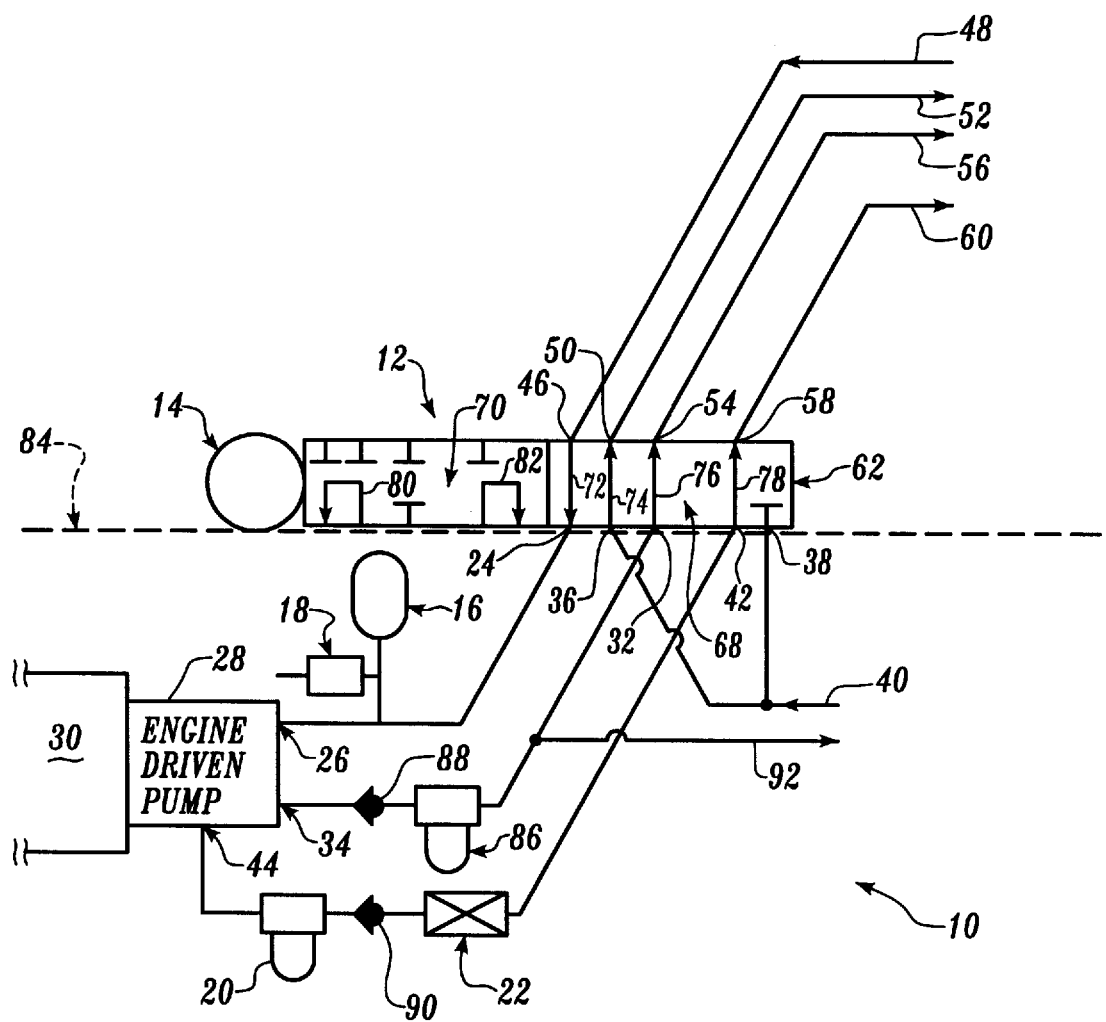
FIG. 1 is a schematic diagram of a first embodiment of the system of the present invention in a first mode of operation.
Figure 2:
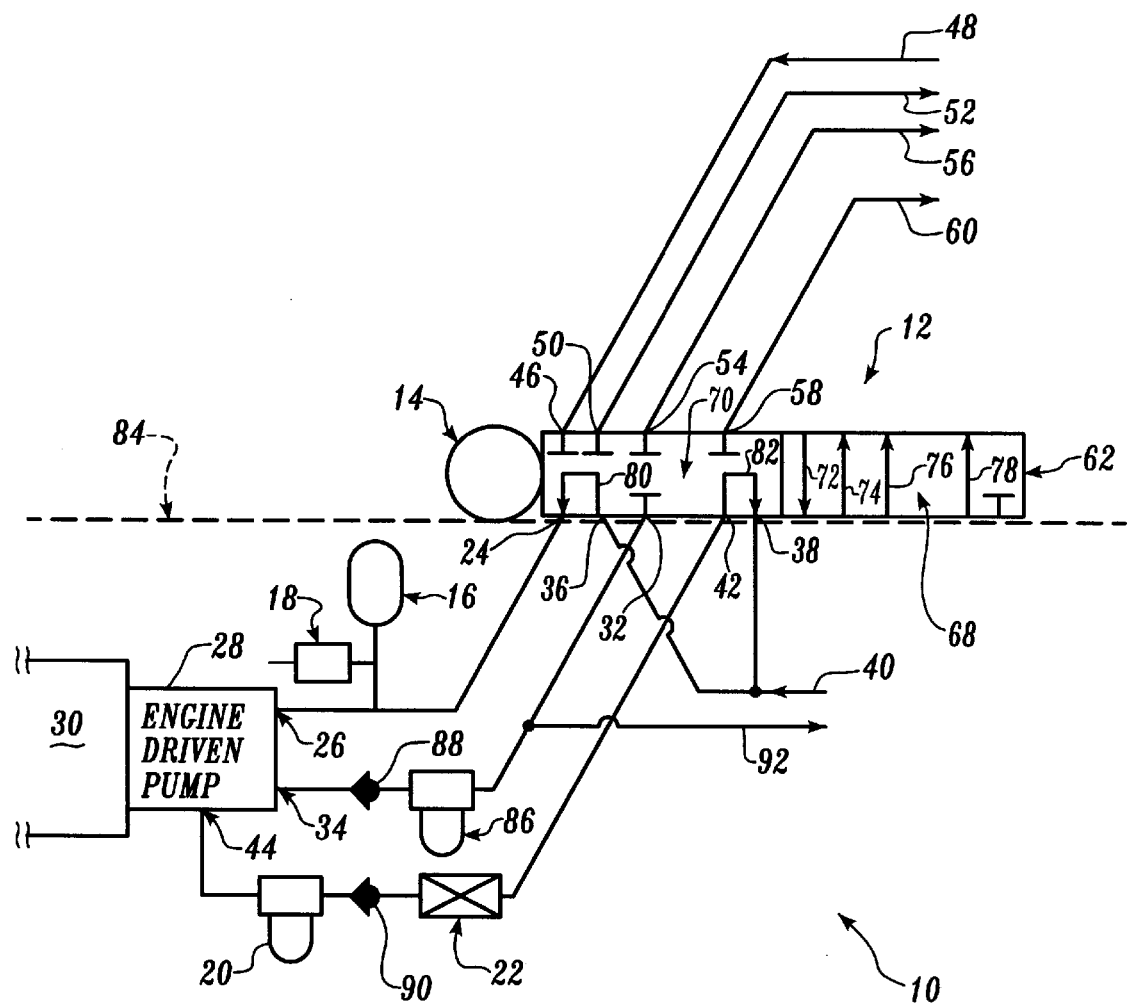
FIG. 2 is a schematic diagram of a first embodiment of the system of the present invention in a second mode of operation.

FIGS. 1 and 2 show a schematic diagram of a first embodiment of a system 10 for maintaining continuity of hydraulic power to propulsion control hydraulic loads in an integrated aircraft hydraulic system. The system 10 includes an isolation valve 12, an actuator 14, an accumulator 16, a relief valve 18, a filter 20, and a heat exchanger 22.

The isolation valve 12 includes a plurality of ports. The isolation valve 12 includes a first port 24 coupled to a suction port 26 of a hydraulic pump 28 driven by an aircraft engine 30. The isolation valve 12 includes a second port 32 coupled to a discharge port 34 of the hydraulic pump 28 through a check valve 88 and a filter 86. The isolation valve 12 includes a third port 36 and a fourth port 38. The third port 36 and the fourth port 38 are coupled to a propulsion return header 40 from the propulsion control hydraulic loads (not shown). The isolation valve 12 includes a fifth port 42. The fifth port 42 is coupled to a case port drain 44 of the hydraulic pump 28 through a pump case drain filter 20, check valve 90, and heat exchanger 22.

The isolation valve 12 includes a sixth port 46 that is coupled to a return header 48 from the airframe hydraulic loads (not shown). The return header 48 may be coupled to a hydraulic fluid reservoir (not shown). The isolation valve 12 includes a seventh port 50 that is coupled to a header 52.

The header 52 may be coupled to a return filter (not shown) that is coupled to the hydraulic fluid reservoir (not shown). The isolation valve 12 includes an eighth port 54 that is coupled to a supply header 56 to the airframe hydraulic loads (not shown), and a ninth port 58 that is coupled to a header 60 that may be coupled to a system heat exchanger (not shown). Alternatively, the header 60 may be coupled to the hydraulic fluid reservoir (not shown).

The isolation valve 12 is preferably a spool valve. The isolation valve 12 includes a valve spool 62 defining a first set 68 of flow channels and a second set 70 of flow channels. The first set of flow channels 68 includes a first flow channel 72, a second flow channel 74, a third flow channel 76, and a fourth flow channel 78. The second set of flow channels 70 includes a fifth flow channel 80, and a sixth flow channel 82.

Figure 3:
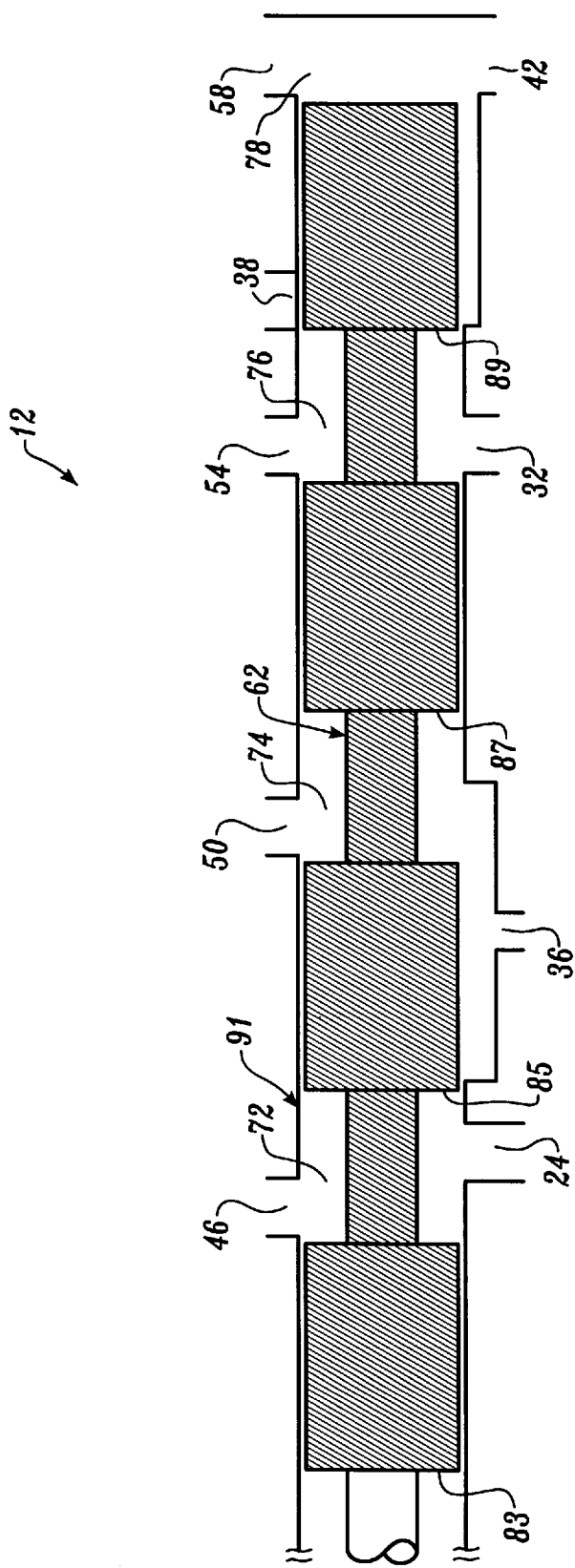
FIG. 3 is a detailed schematic diagram of a portion of the system of FIG. 1.
Figure 4:
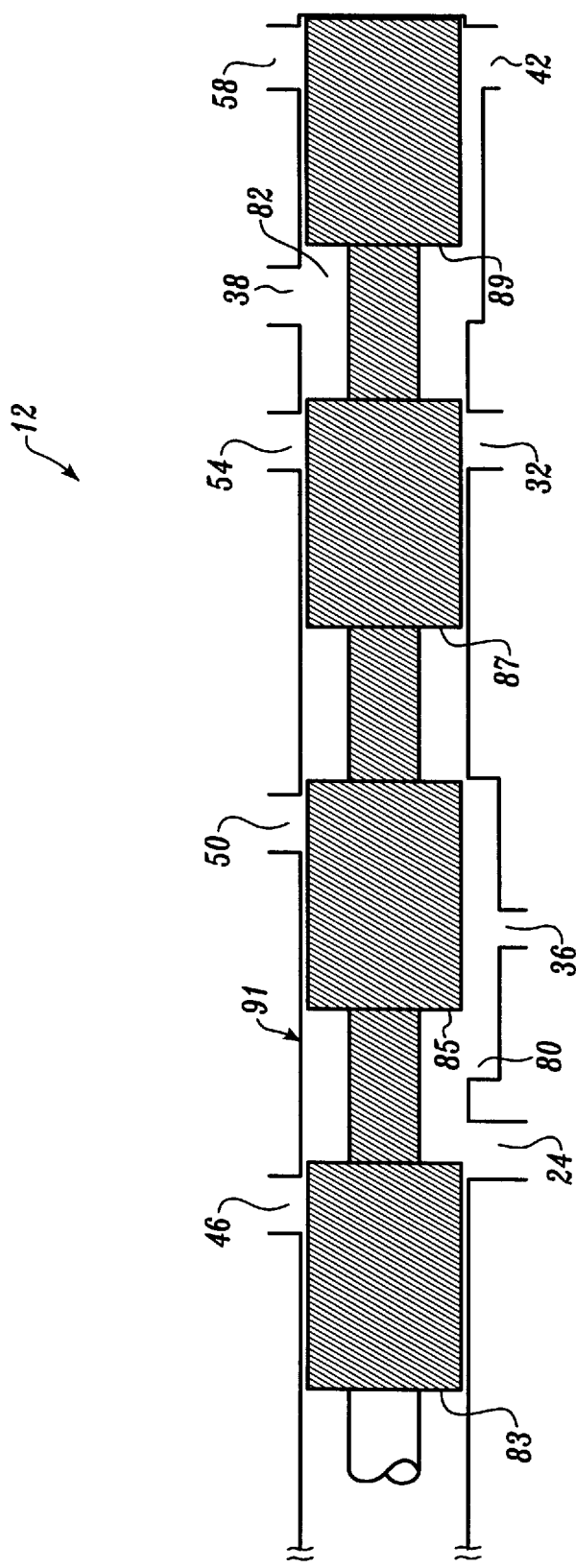
FIG. 4 is a detailed schematic diagram of a portion of the system of FIG. 2.

FIGS. 3 and 4 show detailed schematic diagrams of the spool 62 for the preferred embodiment. The spool 62 includes a first land 83, a second land 85, a third land 87, and a fourth land 89. The spool 62 is located within a sleeve 91.

The valve spool 62 is preferably slidable between a first position and a second position. However, another suitable spool 62 is rotatable between a first position and a second position that are separated by a suitable angle, such as 90°. FIGS. 1 and 3 show the valve spool 62 in the first position. In this first position, the isolation valve 12 permits normal operation of the aircraft's hydraulics, with fluid being supplied to both the propulsion control hydraulic loads and the airframe hydraulic loads, as shall be explained below. When the valve spool 62 is in the first position, the first flow channel 72 is defined by the sleeve 91 and the first and second lands 83 and 85, and the first port 24 is placed in fluid communication with the sixth port 46. The second flow channel 74 is defined by the sleeve 91 and the second and third lands 85 and 87, and the third port 36 is placed in fluid communication with the seventh port 50. The third flow channel 76 is defined by the sleeve 91 and the third and fourth lands 87 and 89, and the second port 32 is placed in fluid communication with the eighth port 54. The fourth flow channel 78 is defined by the sleeve 91 and the fourth land 89, and the fifth port 42 is placed in fluid communication with the ninth port 58.

Referring to FIGS. 2 and 4, when the valve spool 62 is in the second position, the fifth flow channel 80 is defined by the sleeve 91 and the first and second lands 83 and 85, and the third port 36 is placed in fluid communication with the first port 24. The sixth flow channel 82 is defined by the sleeve 91 and the third and fourth lands 87 and 89, and the fifth port 42 is placed in fluid communication with the fourth port 38.

Preferably, the isolation valve 12 is mounted on an engine firewall 84. The system 10 also includes an actuator 14 mechanically coupled to the valve spool 62 for repositioning the valve spool 62 between the first and second positions. The actuator 14 is integrated with the isolation valve 12 and is mounted on the engine firewall 84 along with the isolation valve 12. According to one aspect of the invention, the actuator 14 is an electric motor that is arranged for repositioning the valve spool 62 between the first and second positions. According to another aspect of the invention, the actuator 14 is a solenoid. According to yet another aspect of the invention, the actuator 14 incorporates a pilot valve. In the preferred embodiment, the actuator 14 is arranged for sliding the valve spool 62 longitudinally between the first and second positions. In an alternative embodiment, the actuator 14 is arranged for rotating the valve spool 62 between the first and second positions.

The actuator 14 may be activated in any number of manners well known in the art. For example, an electrical control signal can activate the motor or solenoid aspect of the actuator 14, and a hydraulic control signal can activate the pilot valve aspect of the actuator 14. The electrical control or hydraulic signals can be generated in any acceptable manner well known in the art. For example, a control signal can be generated by a reservoir level sensor (not shown), or a low-pressure sensor (not shown) located in the reservoir (not shown) or in the airframe hydraulic loads (not shown).

The accumulator 16 is coupled to the suction port 26 of the hydraulic pump 28. The accumulator 16 is precharged to a pressure that is slightly less than the cavitation pressure of the suction port 26 of the hydraulic pump 28. The accumulator 16 is preferably a sealed, welded-bellows type of accumulator. However, accumulators are well known in the art, and many types of accumulators are suitable for use in the present invention.

The relief valve 18 is also coupled to the suction port 26 of the hydraulic pump 28. The relief valve 18 provides overpressure protection when the valve spool 62 is in the second position. The relief valve 18 also provides overpressure protection when the valve spool 62 is being repositioned between the first and second positions, and any residual propulsion system return header pressure at the third port 36 of the isolation valve. The relief valve 18 preferably has a minimum relief pressure setting that exceeds the airframe reservoir relief valve maximum full flow pressure requirement, which varies from aircraft to aircraft, by some nominal value, such as by 50 psi. The relief valve 18 also provides protection against surges at the suction port 26 of the hydraulic pump 28 due to sudden reductions of flow demand of the hydraulic pump 28.

The filter 20 is coupled to the case drain port 44 of the hydraulic pump 28. The filter 20 prevents excessive contamination of the hydraulic lines by normal wear particles expelled by the hydraulic pump 28. The system 10 may also include a pump discharge filter 86 that is coupled to the discharge port 34 of the hydraulic pump 28. The filter 86 may be provided for preventing contamination of the propulsion control hydraulic loads (not shown) when the valve spool 62 is in the second position. However, the filter 86 at this location is optional for the propulsion loads because, as is well known, most hydraulic loads contain filters or screens for incoming hydraulic fluid.

The heat exchanger 22 is coupled between the filter 20 and the fifth port 42 for mitigating the rise in hydraulic fluid temperature when the valve spool 62 is in the second position. The heat exchanger 22 is preferably a hydraulic fluid-to-fuel type of heat exchanger that expels heat from the hydraulic fluid to the fuel supplied to the engine 30. In an alternative embodiment, the heat exchanger is a hydraulic fluid-to-air heat exchanger. It is not necessary that the heat exchanger 20 be sized for maintaining the temperature of the hydraulic fluid within a predetermined temperature band when the valve spool 62 is in the first position. It would therefore be desirable to have a hydraulic fluid temperature controlling unit exchanger within the airframe hydraulic system within the fluid header 60. Such a temperature constraint may result in the heat exchanger 22 having a large size that is impracticable. It is desirable that the heat exchanger 22 instead be sized to mitigate the rise in temperature of the hydraulic fluid when the value spool 62 is in the second position.

The system 10 may also include a first backflow prevention valve 88 and a second backflow prevention valve 90.

The first backflow prevention valve 88 is coupled between the discharge port 34 of the hydraulic pump 28 and the pump discharge filter 86. The second backflow prevention valve 90 is coupled between the filter 20 and the heat exchanger 22. The first and second backflow prevention valves 88 and 90 are provided for preventing the backflow of hydraulic fluid to the pump discharge port 34 and the pump case drain 44, respectively, whenever a second pump is installed within a single hydraulic system. In a preferred embodiment, the first and second backflow prevention valves 88 and 90 are poppet check valves. However, many backflow prevention valves that are well known in the art are acceptable, such as ball check valves and flapper check valves.

A supply header 92 for supplying the propulsion control hydraulic loads (not shown) is coupled to the discharge port 34 of the hydraulic pump 28, preferably between the pump discharge filter 86 and the second port 32 of the isolation valve 12. Coupling the supply header 92 to the discharge of the hydraulic pump 28 between the pump discharge filter 86 and the second port 32 reduces the number of flow channels included in the valve 12. This simplifies the design and increases the reliability of the isolation valve 12.

The system 10 shown in FIGS. 1 and 2 operates as follows. When the system 10 is in a normal operating state, the valve spool 62 is in the first position. The hydraulic pump 28 supplies hydraulic fluid from the discharge port 34 through the first backflow prevention valve 88 and the pump discharge filter 86 to the supply header 92 for the propulsion control hydraulic loads (not shown). Hydraulic fluid also flows to the second port 32, the third flow channel 76, the eighth port 54, and the supply header 56 to the airframe hydraulic loads (not shown). Hydraulic fluid returns from the propulsion control hydraulic loads (not shown), through the return header 40 to the third port 36, the second flow channel 74, the seventh port 50, and the header 52 to a return filter (not shown) and to the hydraulic fluid reservoir (not shown). Hydraulic fluid flows from the airframe hydraulic loads (not shown) to the hydraulic fluid reservoir (not shown), and then to the return header 48, the sixth port 46, the first flow channel 72, and from the first port 24 to the suction port 26 of the hydraulic pump 28.

When a hydraulic system loss has been detected by any one of several well known means, such as by the detection of rapid reservoir fluid loss, low reservoir fluid level, low reservoir pressure, or low hydraulic system pressure, the system 10 maintains a continuous supply of propulsion control hydraulics as follows. If, however, the fluid leakage occurs within the propulsion control hydraulic system, or within the pump or its associated components shown in FIG. 1, then hydraulic pressure is lost to the propulsion controls. However, the flow of hydraulic fluid to the airframe hydraulic system is maintained by the activation of the isolation valve 12 to the second position. The actuator 14 is activated to slide the valve spool 62 from the first position to the second position.

As can be seen in FIG. 2, in the second position the isolation valve 12 isolates the airframe hydraulic loads (not shown) from the hydraulic pump 28 by isolating the headers 48, 52, 56, and 60 from the hydraulic pump 28 and the propulsion control headers 40 and 92. Hydraulic fluid flows from the discharge port 34 of the hydraulic pump 28 through the first backflow prevention valve 88 and the pump discharge filter 86 to the supply header 92 for the propulsion control hydraulic loads (not shown). Hydraulic fluid returns from the propulsion control hydraulic loads (not shown) through the return header 40, the third port 36, the fifth flow channel 80, and from the first port 24 to the suction port 26 of the hydraulic pump 28. Hydraulic fluid also flows to the return header 40 from the fourth port 38, the sixth flow channel 82, and the fifth port 42 to the heat exchanger 22, the second backflow prevention valve 90, from the filter 20, and from the pump case drain port 44.

The heat exchanger 22 mitigates the rise in temperature of the hydraulic fluid when the valve spool 62 of the isolation valve 12 is in the second position. The accumulator 16 acts as a system reservoir to provide an expansion volume that accommodates the volume of the hydraulic fluid as it expands due to the increasing temperature of the hydraulic fluid when the valve spool 62 is in the second position. The relief valve 18 provides overpressure protection if the capacity of the expansion volume provided by the accumulator 16 is exceeded.

Figure 5:
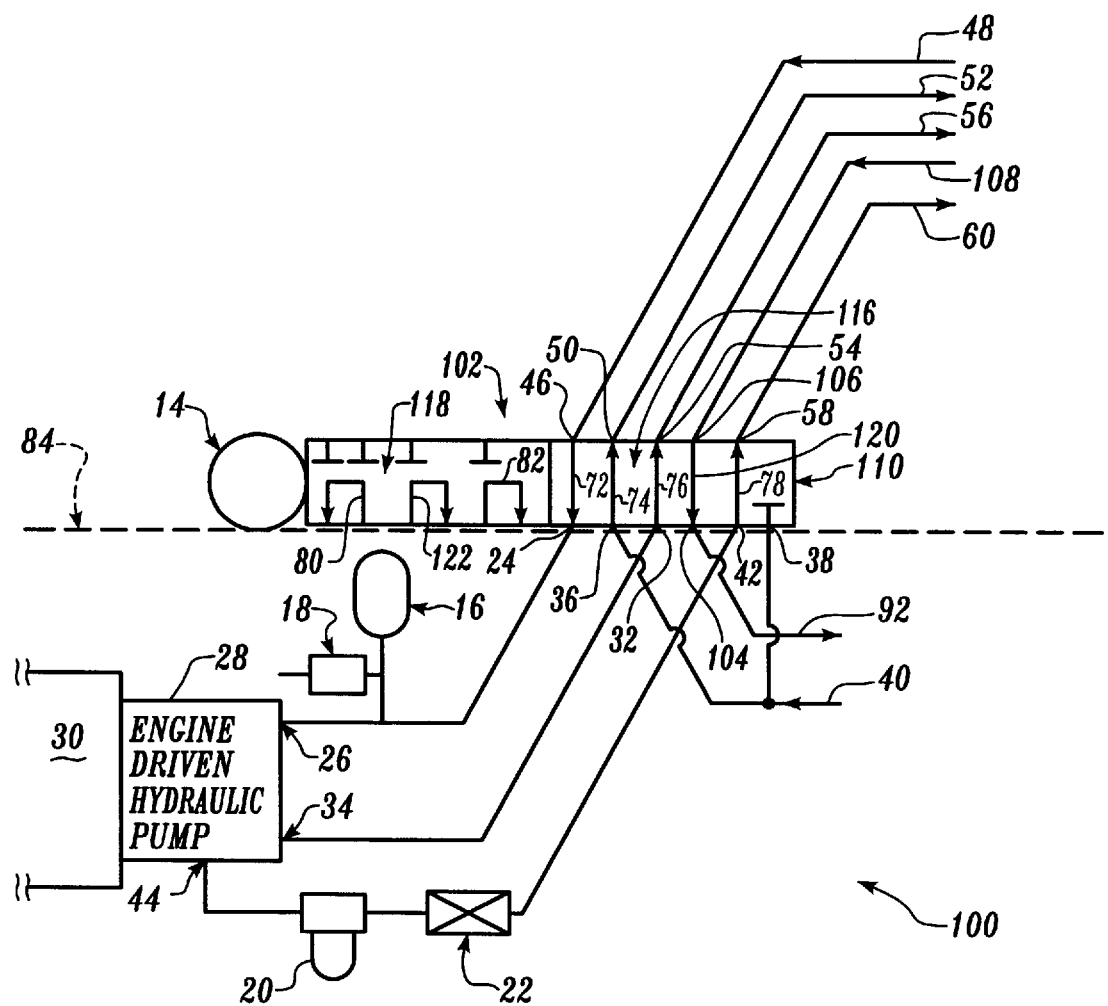
FIG. 5 is a schematic diagram of a second embodiment of the system of the present invention in a first mode of operation.
Figure 6:
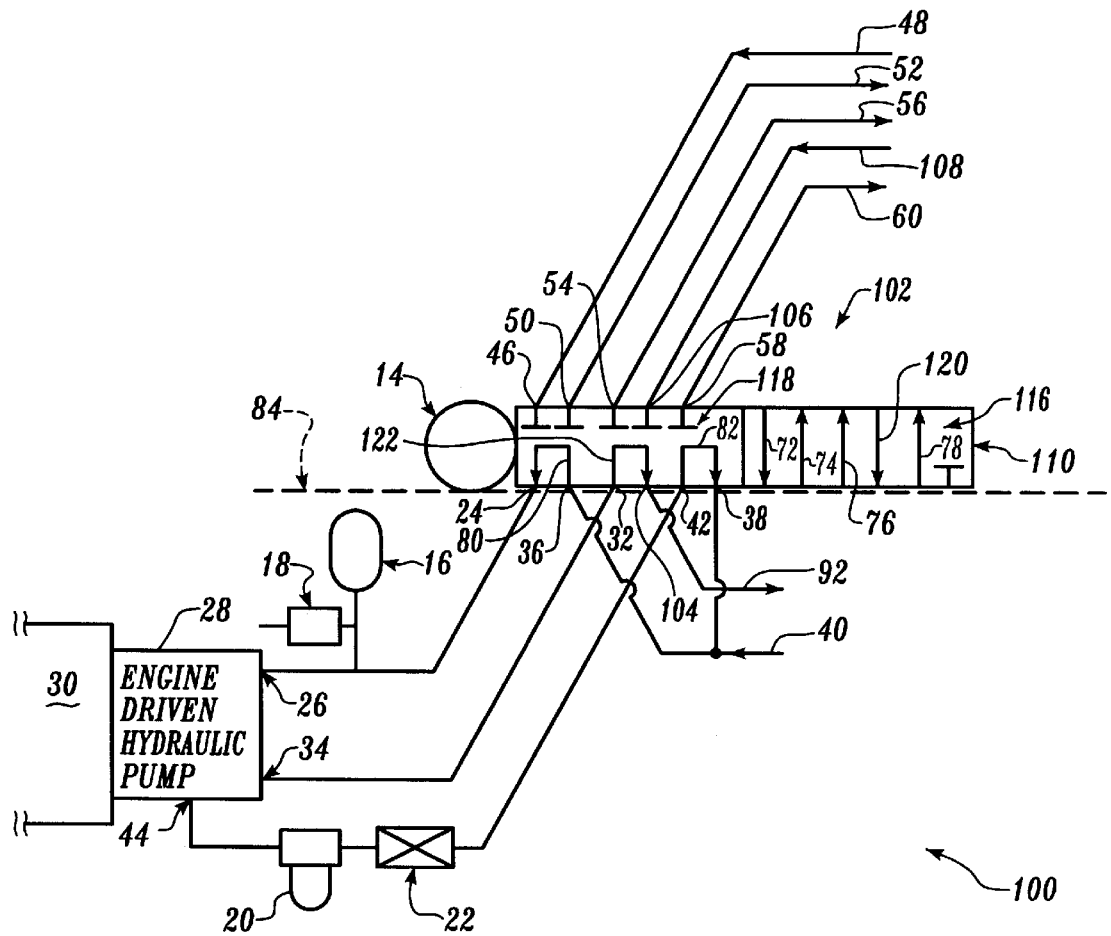
FIG. 6 is a schematic diagram of a second embodiment of the system of the present invention in a second mode of operation.

FIGS. 5 and 6 show a schematic diagram of an alternate embodiment of a system 100 for maintaining continuity of hydraulic power to the propulsion control hydraulic loads in an integrated aircraft hydraulic system. The same reference numerals will be used to denote similar components that are also used in the embodiment shown in FIGS. 1 and 2. The system 100 includes an isolation valve 102, the actuator 14, the accumulator 16, the relief valve 18, the filter 20, and the heat exchanger 22. The differences between the embodiment of FIGS. 1 and 2 and the embodiment of FIGS. 5 and 6 will be explained below.

The isolation valve 102 includes the plurality of ports 24, 32, 36, 38, 42, 46, 50, 54, and 58 included in the isolation valve 12 of FIGS. 1 and 2. In addition, the isolation valve 102 includes a tenth port 104 and an eleventh port 106. The tenth port 104 is coupled to the propulsion controls supply header 92 to the propulsion control hydraulic loads (not shown). The eleventh port 106 is coupled to the airframe hydraulic supply header 108 that is coupled to a system pressure filter (not shown).

The isolation valve 102 is preferably a spool valve. The isolation valve 102 includes a valve spool 110 that defines a first set of flow channels 116 and a second set of flow channels 118. In addition to the flow channels 72, 74, 76, and 78 included in the first set 68 of flow channels, as shown in FIGS. 1 and 2, the first set 116 of flow channels as shown in FIGS. 5 and 6 includes a seventh flow channel 120. Further, in addition to the flow channels 80 and 82 included in the second set 70 of flow channels as shown in FIGS. 1 and 2, the second set 118 of flow channels as shown in FIGS. 5 and 6 includes an eighth flow channel 122.

As shown in FIG. 5, when the valve spool 110 is in a first position, the seventh flow channel 120 places the tenth port 104 in fluid communication with the eleventh port 106. As shown in FIG. 6, when the valve spool 110 is in the second position, the eighth flow channel 122 places the second port 32 in fluid communication with the tenth port 104.

The system 100 shown in FIGS. 5 and 6 operates as follows. The airframe hydraulic loads (not shown) are supplied with hydraulic fluid as described above for the system 10 shown in FIGS. 1 and 2. However, the system 100 of FIGS. 5 and 6 supplies hydraulic fluid to the propulsion control hydraulic loads (not shown) as described below. When the system 100 is in a normal operating state and the valve spool 110 is in the first position, as shown in FIG. 5, the hydraulic pump 28 supplies hydraulic fluid from the discharge port 34 to the second port 32, the third flow channel 76, the eighth port 54, and the supply header 56 to the system pressure filter (not shown). Hydraulic fluid flows from the system pressure filter (not shown) through the header 108 to the eleventh port 106, through the seventh flow channel 120, to the tenth port 104, and through the supply header 92 to the propulsion control hydraulic loads (not shown). Hydraulic fluid flows from the propulsion control hydraulic loads (not shown) through the return header 40 in the same manner as discussed for the system 10 shown in FIG. 1.

When an airframe hydraulic system loss has been detected as described above for the system 10 of FIGS. 1 and 2, the system 100 maintains a continuous supply of propulsion control hydraulics as follows. The actuator 14 slides the valve spool 110 from the first position to the second position. As can be seen in FIG. 6, in the second position the isolation valve 102 isolates the airframe hydraulic loads (not shown) from the hydraulic pump 28 by isolating the headers 48, 52, 56, 60, and 108. Hydraulic fluid flows from the discharge port 34 of the hydraulic pump 28 through the isolation valve 102, second port 32, the eighth flow channel 122, and the tenth port 104 to the supply header 92 to the propulsion control hydraulic loads (not shown). Hydraulic fluid returns from the propulsion control hydraulic loads (not shown) as described above for the system 10 as shown in FIG. 2. The remainder of the operation of the system 100 is similar to the operation of the system 10.

Figure 7:
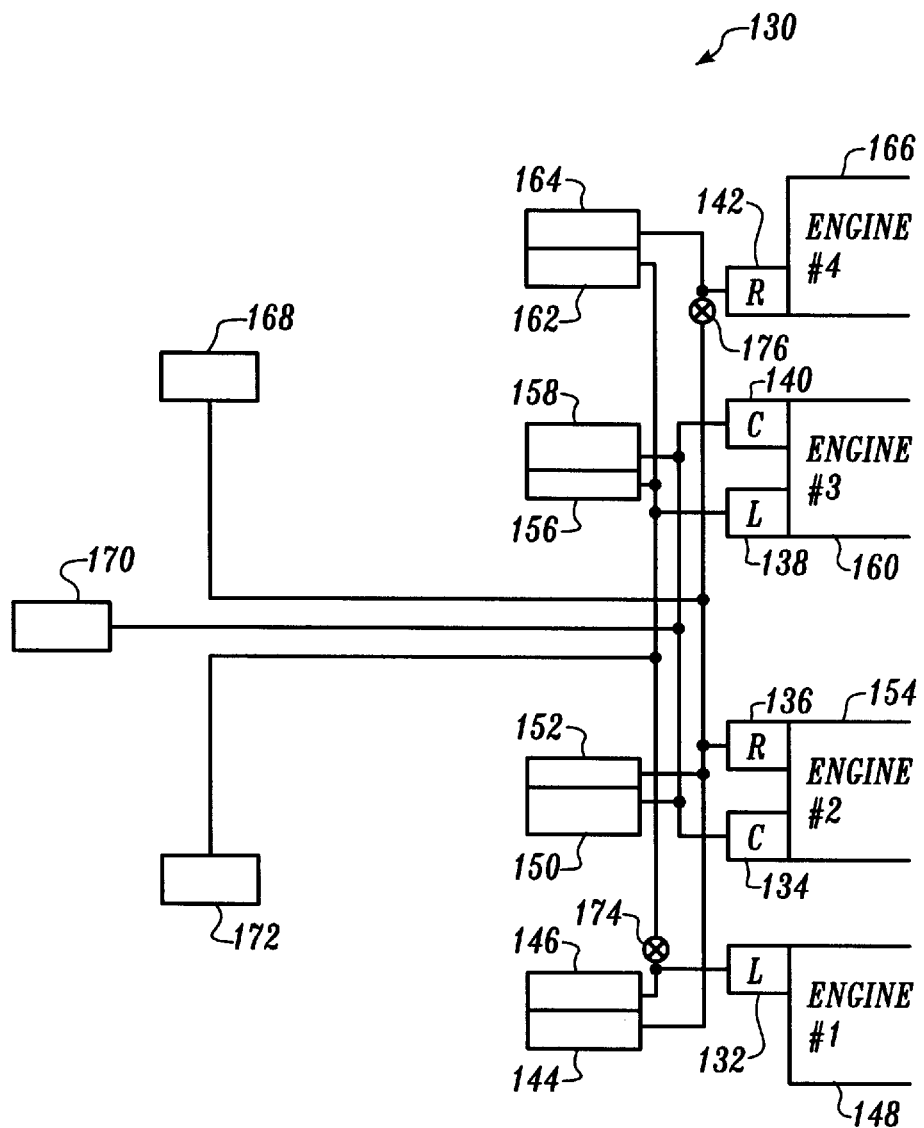
FIG. 7 is a block diagram of an aircraft hydraulic system having a system for maintaining continuity of hydraulic power according to the present invention.

FIG. 7 shows a suitable hydraulic system 130 given by way of a non-limiting example that includes a system for maintaining continuity of hydraulic power to propulsion control hydraulic loads utilizing either isolation valves 12 or isolation valves 102 as previously described. The hydraulic system 130 includes first, second, third, fourth, fifth, and sixth engine-driven hydraulic pumps 132, 134, 136, 138, 140, and 142, respectively. The hydraulic system 130 also includes first and second sets 144 and 146 of propulsion control hydraulic loads for a first aircraft engine 148; first and second sets 150 and 152 of propulsion control hydraulic loads for a second aircraft engine 154; first and second sets 156 and 158 of propulsion control hydraulic loads for a third aircraft engine 160; and first and second sets 162 and 164 of propulsion control hydraulic loads for a fourth aircraft engine 166. The system 130 includes a first set 168 of airframe hydraulic loads, a second set 170 of airframe hydraulic loads, and a third set 172 of airframe hydraulic loads. The system 130 also includes a first isolation valve 174 and a second isolation valve 176.

The first hydraulic pump 132 is an engine-driven hydraulic pump that is mounted on the first aircraft engine 148. The second hydraulic pump 134 and the third hydraulic pump 136 are engine-driven hydraulic pumps that are mounted on the second aircraft engine 154. The fourth hydraulic pump 138 and the fifth hydraulic pump 140 are engine-driven hydraulic pumps that are mounted on the third aircraft engine 160. The sixth hydraulic pump 142 is an engine-driven hydraulic pump that is mounted on the fourth aircraft engine 166.

The hydraulic system 130 includes a right subsystem, a center subsystem, and a left subsystem. The right subsystem includes the second set 146 of propulsion control hydraulic loads for the first aircraft engine 148, the second set 152 of propulsion control hydraulic loads for the second aircraft engine 154, the third hydraulic pump 136, the first set 168 of airframe hydraulic loads, the second isolation valve 176, the sixth hydraulic pump 142, and the second set 164 of propulsion control hydraulic loads for the fourth aircraft engine 166. The second set 146 of propulsion control hydraulic loads for the first aircraft engine 148 and the second set 152 of propulsion control hydraulic loads for the second aircraft engine 154 are coupled to the third hydraulic pump 136. The first set 168 of airframe hydraulic loads is coupled to the third hydraulic pump 136 and to the second isolation valve 176. The second isolation valve 176 is also coupled to the sixth hydraulic pump 142. The second set 164 of propulsion control hydraulic loads for the fourth aircraft engine 166 is coupled to the sixth hydraulic pump 142.

The center subsystem includes the second hydraulic pump 134, the first set 150 of propulsion control hydraulic loads for the second aircraft engine 154, the second set 170 of airframe hydraulic loads, the second set 158 of propulsion control hydraulic loads for the third aircraft engine 160, and the fifth hydraulic pump 140. The second hydraulic pump 134 is coupled to the first set 150 of propulsion control hydraulic loads for the second aircraft engine 154 and to the second set 170 of airframe hydraulic loads. The fifth hydraulic pump 140 is coupled to the second set 158 of propulsion control hydraulic loads for the third aircraft engine 160 and to the second set 170 of airframe hydraulic loads.

The left subsystem includes the first set 144 of propulsion control hydraulic loads for the first aircraft engine 148, the first hydraulic pump 132, the first isolation valve 174, the third set 172 of airframe hydraulic loads, the fourth hydraulic pump 138, the first set 156 of propulsion control hydraulic loads for the third aircraft engine 160, and the first set 162 of propulsion control hydraulic loads for the fourth aircraft engine 166. The first set 144 of propulsion control hydraulic loads for the first aircraft engine 148 is coupled to the first hydraulic pump 132. The first isolation valve 174 is coupled to the first hydraulic pump 132. The third set 172 of airframe hydraulic loads is coupled to the first isolation valve 174 and the fourth hydraulic pump 138. The first set 156 of propulsion control hydraulic loads for the third aircraft engine 160 and the first set 162 of propulsion control hydraulic loads (not shown) for the fourth aircraft engine 166 are coupled to the fourth hydraulic pump 138.

In one embodiment of the hydraulic system 130, each of the first and second isolation valves 174 and 176 is an isolation valve 12 that is connected as discussed above for the system 10 as shown in FIGS. 1 and 2. In another embodiment, each of the first and second isolation valves 174 and 176 is an isolation valve 102 as described for the system 100 of FIGS. 5 and 6.

The following casualty scenario is provided by way of example to explain the operation of the hydraulic system 130. In a normal mode of operation, the right subsystem, the center subsystem, and the left subsystem are all functional. That is, in the right subsystem, the third hydraulic pump 136 and the sixth hydraulic pump 142 are supplying hydraulic fluid to the second set 146 of propulsion control hydraulic loads for the first aircraft engine 148, the second set 152 of propulsion control hydraulic loads for the second aircraft engine 154, the first set 168 of airframe hydraulic loads, and the second set 164 of propulsion control hydraulic loads for the fourth aircraft engine 166. In the center subsystem, the second hydraulic pump 134 and the fifth hydraulic pump 140 are supplying hydraulic fluid to the first set 150 of propulsion control hydraulic loads for the second aircraft engine 154, the second set 170 of airframe hydraulic loads, and the second set 158 of propulsion control hydraulic loads for the third aircraft engine 160. In the left subsystem, the first hydraulic pump 132 and the fourth hydraulic pump 138 are supplying hydraulic fluid to the second set 146 of propulsion control hydraulic loads for the first aircraft engine 148, the third set 172 of airframe hydraulic loads, the first set 156 of propulsion control hydraulic loads for the third aircraft engine 160, and the first set 162 of propulsion control hydraulic loads for the fourth aircraft engine 166. The first and second isolation valves 174 and 176 are each in the normal operating state, i.e., the first positions, as described above for FIGS. 1 and 5.

The hydraulic system 130 maintains continuity of propulsion control hydraulics in the event of a loss of airframe hydraulics, as illustrated in the following example. Suppose a loss of the left subsystem has occurred. For example, a leak may have been detected in the third set 172 of airframe hydraulic loads. The first isolation valve 174 shifts to the second position as described above for FIGS. 2 and 6. Because the fourth hydraulic pump 138 is secured and the first isolation valve 174 has shifted as described above, the flow of hydraulic fluid is secured to the third set 172 of airframe hydraulic loads, the first set 162 of propulsion control hydraulic loads for the fourth aircraft engine 166, and the first set 156 of propulsion control hydraulic loads for the third aircraft engine 160. Therefore, hydraulic fluid is supplied to only the second set 158 of propulsion control hydraulic loads for the third aircraft engine 160 and to the second set 164 of propulsion control hydraulic loads for the fourth aircraft engine 166. Thus, the third aircraft engine 160 and fourth aircraft engine 166 are being operated at a reduced propulsion control reliability level.

However, as described above for FIGS. 2 and 6, the flow of hydraulic fluid is maintained to the first set 144 of propulsion control hydraulic loads for the first aircraft engine 148. Therefore, the flow of hydraulic fluid has been maintained to the first set 144 and the second set 146 of propulsion control hydraulic loads for the first aircraft engine 148. Therefore, according to the present invention, the first aircraft engine 148 can remain operating at a high propulsion control reliability level with the partial loss of the left subsystem. As will be appreciated, the right and center subsystems remain unaffected, so the first and second sets 150 and 152 of propulsion control hydraulic loads for the second engine 134 remain operational.

The hydraulic system 130 operates similarly to maintain continuity of propulsion control hydraulics to the first and second sets 162 and 164 of propulsion control hydraulic loads (not shown) for the fourth aircraft engine 166 in the event of a loss of the right subsystem. As will be appreciated, the third engine 160 and the fourth engine 166 can remain operating at a high reliability level with the loss of the right subsystem. As will also be appreciated, the operation of the first and fourth aircraft engines 148 and 166 remains unaffected by a loss of the center subsystem.

While the preferred embodiment of the invention has been illustrated and described, it will be appreciated that various changes (for example, without limitation, number of engines, number of hydraulic systems, number of hydraulic pumps per system, number of isolation valves, number of propulsion control redundance, and the hydraulic pump source of power) can be made therein without departing from the spirit and scope of the invention.

The embodiments of the invention in which an exclusive property or privilege is claimed are defined as follows:

1. A system for maintaining continuity of hydraulic power from an aircraft engine-driven hydraulic pump to a first set of propulsion control hydraulic loads for controlling the aircraft engine, the engine-driven hydraulic pump providing hydraulic power to a second set of airframe hydraulic loads, the engine-driven hydraulic pump having a pump suction having a first pressure and a pump discharge having a second pressure that is greater than the first pressure, the system comprising:

an isolation valve having first ports coupled to the first set of propulsion control hydraulic loads, second ports coupled to the second set of airframe hydraulic loads, and third ports coupled to the hydraulic pump, said isolation valve having a first state and a second state, said isolation valve placing the third ports in fluid communication with the first and second ports when said isolation valve is in the first state, said isolation valve isolating the second ports from the third ports when said isolation valve is in the second state, said isolation valve maintaining the first ports in fluid communication with the third ports when said isolation valve is in the second state; and wherein said isolation valve comprises a spool valve having a spool and sleeve defining first and second sets of flow channels, the first set of flow channels being arranged for coupling the first and second ports in fluid communication with the third ports when the spool is in a first position, said isolation valve being in the first state when the spool is in the first position, the second set of flow channels being arranged for isolating the second ports from the first and third ports and for coupling the first ports in fluid communication with the third ports when the spool is in a second position, said isolation valve being in the second state when the spool is in the second position.

2. The system of claim 1, wherein the first set of flow channels is arranged for placing a return header from the first set of propulsion control hydraulic loads in fluid communication with the return header from the second set of airframe hydraulic loads when the spool is in the first position, the first set of flow channels being arranged for placing a supply header to the second set of airframe hydraulic loads in fluid communication with the hydraulic pump discharge when the spool is in the first position, the first set of flow channels being arranged for placing a supply header to the first set of propulsion control hydraulic loads in fluid communication with the supply header to the second set of hydraulic loads when the spool is in the first position, the second set of flow channels being arranged for placing the return header from the first set of propulsion control hydraulic loads in fluid communication with the hydraulic pump suction when the spool is in the second position, the second set of flow channels being arranged for placing the supply header to the first set of propulsion control hydraulic loads in fluid communication with the hydraulic pump discharge when the spool is in the second position.

3. The system of claim 1, wherein the spool is slidably movable between the first and second positions.

4. The system of claim 3, further comprising:

an actuator for slidably moving the spool between the first and second positions.

5. The system of claim 4, further comprising:

an accumulator coupled to the engine-driven hydraulic pump suction, said accumulator being chargeable at a third pressure that is less than the first pressure.

6. The system of claim 5, further comprising:

a relief valve coupled to the engine-driven hydraulic pump suction, said relief valve having a relief setpoint at a fourth pressure that is greater than the second pressure.

7. The system of claim 6, further comprising:

a heat exchanger coupled to a case drain of the engine-driven hydraulic pump.

8. The system of claim 1, wherein a supply header to the first set of propulsion control hydraulic loads is coupled to the hydraulic pump discharge and wherein the first set of flow channels is arranged for placing a return header from the first set of propulsion control hydraulic loads in fluid communication with the return header from the second set of airframe hydraulic loads when the spool is in the first position, the first set of flow channels being arranged for placing an airframe supply header to the second set of airframe hydraulic loads in fluid communication with the hydraulic pump discharge when the spool is in the first position, the second set of flow channels being arranged for placing the return header from the first set of propulsion control hydraulic loads in fluid communication with the hydraulic pump suction when the spool is in the second position.

9. A system for maintaining continuity of hydraulic power from an aircraft engine-driven hydraulic pump to a first set of propulsion control hydraulic loads for controlling the aircraft engine, the engine-driven hydraulic pump providing hydraulic power to a second set of airframe hydraulic loads, the hydraulic pump having a pump suction having a first pressure and a pump discharge having a second pressure that is higher than the first pressure, the pump discharge being coupled to supply hydraulic power to the first set of hydraulic loads, the system comprising:

a spool valve having a plurality of ports and a spool, the valve including a spool and sleeve defining first and second sets of flow channels, the spool being slidably movable between first and second positions, the first set of flow channels being arranged for placing a port coupled to the hydraulic pump suction in fluid communication with a port coupled to a suction header from the second set of hydraulic loads when the spool is in the first position, the first set of flow channels being arranged for placing a first port coupled to a return header from the first set of propulsion control hydraulic loads in fluid communication with a port coupled to the return header from the second set of airframe hydraulic loads when the spool is in the first position, the first set of flow channels being arranged for placing a port coupled to the hydraulic pump discharge in fluid communication with a port coupled to the supply header to the second set of airframe hydraulic loads when the spool is in the first position, the second set of flow channels being arranged for placing the port coupled to the hydraulic pump suction in fluid communication with the first port coupled to the return header from the first set of propulsion control hydraulic loads when the spool is in the second position; and an actuator for slidably moving the spool between the first and second positions.

10. The system of claim 9, further comprising:

an accumulator coupled to the engine-driven hydraulic pump suction, said accumulator being chargeable at a third pressure that is less than the first pressure.

11. The system of claim 10, further comprising:

a relief valve coupled to the engine-driven hydraulic pump suction, said relief valve having a relief setpoint at a fourth pressure that is greater than the second pressure.

12. The system of claim 11, further comprising:

a heat exchanger coupled to a case drain of the engine-driven hydraulic pump and to a port of said spool valve, wherein the second set of flow channels is arranged for placing the port coupled to said heat exchanger in fluid communication with a second port coupled to the return header from the first set of propulsion control hydraulic loads when the spool is in the second position.

13. A system for maintaining continuity of hydraulic power from an aircraft engine-driven hydraulic pump to a first set of propulsion control hydraulic loads for controlling the aircraft engine, the engine-driven hydraulic pump providing hydraulic power to a second set of airframe hydraulic loads, the hydraulic pump having a pump suction having a first pressure and a pump discharge having a second pressure that is higher than the first pressure, the system comprising:

a spool valve having a plurality of ports, the valve having a spool and sleeve defining first and second sets of flow channels, the spool being slidably movable between first and second positions, the first set of flow channels being arranged for placing a port coupled to the hydraulic pump suction in fluid communication with a first port coupled to a suction header from the second set of airframe hydraulic loads when the spool is in the first position, the first set of flow channels being arranged for placing a first port coupled to a return header from the first set of propulsion control hydraulic loads in fluid communication with a port coupled to the return header from the second set of airframe hydraulic loads when the spool is in the first position, the first set of flow channels being arranged for placing a port coupled to the hydraulic pump discharge in fluid communication with a first port coupled to a supply header to the second set of airframe hydraulic loads when the spool is in the first position, the first set of flow channels being arranged for placing a port coupled to a supply header to the first set of propulsion control hydraulic loads in fluid communication with a second port coupled to the supply header to the second set of airframe hydraulic loads when the spool is in the first position, the second set of flow channels being arranged for placing the port coupled to the hydraulic pump suction in fluid communication with the port coupled to the return header from the first set of propulsion control hydraulic loads when the spool is in the second position, the second set of flow channels being arranged for placing the port coupled to the hydraulic pump discharge in fluid communication with the port coupled to the supply header to the first set of propulsion control hydraulic loads when the spool is in the second position; and an actuator for slidably moving the spool between the first and second positions.

14. The system of claim 13, further comprising:

an accumulator coupled to the engine-driven hydraulic pump suction, said accumulator being chargeable at a third pressure that is less than the first pressure.

15. The system of claim 14, further comprising:

a relief valve coupled to the engine-driven hydraulic pump suction, said relief valve having a relief setpoint at a fourth pressure that is greater than the second pressure.

16. The system of claim 15, further comprising:

a heat exchanger coupled to a case drain of the engine-driven hydraulic pump and to a port of said spool valve, wherein the second set of flow channels is arranged for placing the port coupled to said heat exchanger in fluid communication with a second port coupled to the return header from the first set of propulsion control hydraulic loads when the spool is in the second position.

17. An aircraft hydraulic system for providing hydraulic power to sets of engine control hydraulic loads and airframe hydraulic loads, the hydraulic system comprising:

a first hydraulic pump driven by a first aircraft engine;

a second hydraulic pump driven by a second aircraft engine;

a first set of first engine control hydraulic loads for controlling the first aircraft engine, said first set of first engine control hydraulic loads being coupled to said first hydraulic pump;

a second set of first engine control hydraulic loads for controlling the first aircraft engine, said second set of first engine control hydraulic loads being coupled to said second hydraulic pump;

a first set of airframe hydraulic loads coupled to said first hydraulic pump;

a first isolation valve coupled to said first set of airframe hydraulic loads and said first set of first engine control hydraulic loads and said first hydraulic pump, said first isolation valve being selectively positionable for isolating said first set of airframe hydraulic loads from said first hydraulic pump and for maintaining said first set of first engine control hydraulic loads in fluid communication with said first hydraulic pump when said first set of airframe hydraulic loads is isolated from said first hydraulic pump; and wherein said isolation valve comprises a spool valve having a spool and sleeve defining first and second sets of flow channels, the first set of flow channels being arranged for coupling the first and second ports in fluid communication with the third ports when the spool is in a first position, said isolation valve being in the first state when the spool is in the first position, the second set of flow channels being arranged for isolating the second ports from the first and third ports and for coupling the first ports in fluid communication with the third ports when the spool is in a second position, said isolation valve being in the second state when the spool is in the second position.

18. The hydraulic system of claim 17, further comprising:

a third hydraulic pump driven by the second aircraft engine;

a first set of second engine control hydraulic loads for controlling the second aircraft engine coupled to said third hydraulic pump; and a second set of second engine control hydraulic loads for controlling the second aircraft engine coupled to said second hydraulic pump.

19. The hydraulic system of claim 18, further comprising:

a fourth hydraulic pump driven by a third aircraft engine;

a fifth hydraulic pump driven by a fourth aircraft engine;

a first set of third engine control hydraulic loads for controlling the third engine coupled to said fourth hydraulic pump;

a second set of third engine control hydraulic loads for controlling the third engine coupled to said fifth hydraulic pump;

a second set of airframe hydraulic loads coupled to said fourth hydraulic pump; and a second isolation valve coupled to said second set of airframe hydraulic loads and said first set of third engine control hydraulic loads and said fourth hydraulic pump, said second isolation valve being selectively positionable for isolating said second set of airframe hydraulic loads from said fourth hydraulic pump and for maintaining said first set of third engine control hydraulic loads in fluid communication with said fourth hydraulic pump when said second set of airframe hydraulic loads is isolated from said fourth hydraulic pump.

* * * * *

UNITED STATES PATENT AND TRADEMARK OFFICE
CERTIFICATE OF CORRECTION

PATENT NO. : 5,873,548
DATED : February 23, 1999
INVENTOR(S) : D.W. Huling

It is certified that error appears in the above-indentified patent and that said Letters Patent is hereby corrected as shown below:

On the title page,

| COLUMN | LINE | |
|---|---|---|
| [54] Pg. 1, col. 1 | Title | "AIRACRAFT" should read --AIRCRAFT-- |
| [56] Pg. 1, col. 1 | Refs. Cited (Other Publs.) | "Hyudraulic" should read --Hydraulic-- |
| Pg. 1, col. 1 | Attorney, Agent, or Firm | "O'Conner" should read --O'Connor-- |

Signed and Sealed this

Third Day of August, 1999

Attest:

Attesting Officer

Q. TODD DICKINSON

Acting Commissioner of Patents and Trademarks